US011679426B2

(12) United States Patent
Luo et al.

(10) Patent No.: US 11,679,426 B2
(45) Date of Patent: Jun. 20, 2023

(54) ROLLING-BULGING FORMING HYDRAULIC MACHINE FOR TUBULAR PRODUCTS

(71) Applicant: YANSHAN UNIVERSITY, Hebei (CN)

(72) Inventors: Junting Luo, Hebei (CN); Guolu Zheng, Hebei (CN); Chenguang Cui, Hebei (CN); Lili Zhang, Hebei (CN); Chunxiang Zhang, Hebei (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 17/201,385

(22) Filed: Mar. 15, 2021

(65) Prior Publication Data

US 2021/0299720 A1    Sep. 30, 2021

(30) Foreign Application Priority Data

Mar. 26, 2020  (CN) .......................... 202010221752.6

(51) Int. Cl.
*B21B 31/32* (2006.01)
*B21B 31/02* (2006.01)
(Continued)

(52) U.S. Cl.
CPC .............. *B21B 31/32* (2013.01); *B21B 31/02* (2013.01); *B21B 2013/025* (2013.01); *B21B 2013/106* (2013.01); *F16C 29/005* (2013.01)

(58) Field of Classification Search
CPC ... B21B 31/32; B21B 31/02; B21B 2013/025; B21B 2013/106; B21B 17/00;
(Continued)

(56) References Cited

U.S. PATENT DOCUMENTS 1,750,784 A * 3/1930 Petersen ................ B21D 17/04
72/101
2,004,816 A * 6/1935 Lindgren ............... B21D 51/20
198/346.2
(Continued)

FOREIGN PATENT DOCUMENTS

CN        1528557 A      9/2004
CN      107413882 A     12/2017
(Continued)

OTHER PUBLICATIONS

Mounting Options—Anderson Cook Machine Tool (https://www.andersoncook.com/machine-tools/mounting-options/) (website accessed Dec. 10, 2022) (Year: 2017).*

*Primary Examiner* — Shelley M Self
*Assistant Examiner* — Fred C Hammers

(57) ABSTRACT

The present invention discloses a rolling-bulging forming hydraulic machine for tubular products, which includes a frame. The frame is provided with an upper rolling mechanism, a lower rolling mechanism, a fixed liquid bulging hydraulic cylinder and a movable liquid bulging hydraulic cylinder. The upper rolling mechanism and the lower rolling mechanism are arranged oppositely, and the upper rolling mechanism and the lower rolling mechanism are used to roll surfaces of a to-be-machined tubular product. The fixed liquid bulging hydraulic cylinder and the movable liquid bulging hydraulic cylinder are arranged oppositely, and the fixed liquid bulging hydraulic cylinder and the movable liquid bulging hydraulic cylinder are used to perform hydraulic bulging on the to-be-machined tubular product.

6 Claims, 6 Drawing Sheets

(51) Int. Cl.
*B21B 13/02* (2006.01)
*B21B 13/10* (2006.01)
*F16C 29/00* (2006.01)

(58) Field of Classification Search
CPC ....... B21B 23/00; F16C 29/005; B21D 26/00; B21D 26/02; B21D 26/033; B21D 26/047; B21D 17/04; F16K 11/00; F16K 11/105; F16K 13/00; F16K 2200/00; F16K 2200/20; F16K 2200/204
USPC .... 72/245, 59; 251/147, 148, 153, 359, 361, 251/363
See application file for complete search history.

(56) References Cited

U.S. PATENT DOCUMENTS

| | | | | |
|---|---|---|---|---|
| 2,458,854 | A * | 1/1949 | Hull | B29C 57/06 72/58 |
| 2,773,538 | A * | 12/1956 | De Mers | B21D 15/10 285/226 |
| 3,520,163 | A * | 7/1970 | Otoda | B21D 26/06 72/59 |
| 4,646,549 | A * | 3/1987 | Saito | B21H 5/027 72/469 |
| 5,058,619 | A * | 10/1991 | Zheng | A61M 39/16 137/240 |
| 6,047,581 | A * | 4/2000 | Everlove, Jr. | B21H 5/027 72/20.1 |
| 6,216,509 | B1 * | 4/2001 | Lotspaih | B21C 37/185 72/61 |
| 2016/0208937 | A1* | 7/2016 | Yamaki | F16K 15/042 |
| 2018/0369893 | A1* | 12/2018 | Weigelt | B21D 28/325 |

FOREIGN PATENT DOCUMENTS

| | | |
|---|---|---|
| CN | 107520311 A | 12/2017 |
| CN | 109127852 A | 1/2019 |
| CN | 109174970 A | 1/2019 |
| CN | 109290422 A | 2/2019 |
| CN | 110773621 A | 2/2020 |
| JP | H07164067 A | 6/1995 |

* cited by examiner

ROLLING-BULGING FORMING HYDRAULIC MACHINE FOR TUBULAR PRODUCTS

CROSS-REFERENCE TO RELATED APPLICATIONS

This application claims the benefit of priority from Chinese Patent Application No. 202010221752.6, filed on Mar. 26, 2020. The content of the aforementioned applications, including any intervening amendments thereto, is incorporated herein by reference in its entirety.

TECHNICAL FIELD

The present invention relates to the technical field of metal plastic forming, and particularly relates to a rolling-bulging forming hydraulic machine for tubular products.

BACKGROUND OF THE PRESENT INVENTION

Hydraulic machines are pressing equipment that uses a hydraulic transmission technology. Compared with mechanical presses, the hydraulic machines have the advantages of stepless adjustment of pressure and velocity in a wide range, capability of outputting all power and keeping the required pressure in any position, flexible structural layout and coordination of actions of actuators. Meanwhile, hydraulic elements are highly generalized and standardized and are simple to design and manufacture. Therefore, the hydraulic machines have been widely used in various departments of national economy.

At present, a majority of small and medium-sized tubular products are formed by adopting a rubber bulging technology or a hydraulic bulging technology, so that a tube blank can be formed in a radial expansion manner under the internal pressure. However, the bulging process is likely to cause non-uniform wall thickness of the tubular product, thereby resulting in serious reduction of the thickness of a bulging deformed part of the tubular product and affecting the forming performance and use performance of the tubular product.

SUMMARY OF THE PRESENT INVENTION

A purpose of the present invention is to provide a rolling-bulging forming hydraulic machine for tubular products, which forms a to-be-machined tubular product under the simultaneous action of internal pressure hydraulic bulging and external rolling forming. The diameter reduction and expansion of the to-be-machined tubular product are carried out simultaneously and coordinated with each other, so that the shape forming can be realized, the wall thickness of a bulging area is not thinned excessively as far as possible, and the uniformity of wall thickness and performance of formed products is enhanced.

To realize the above purpose, the present invention adopts the following technical solutions:

The present invention provides a rolling-bulging forming hydraulic machine for tubular products, which includes a frame, wherein the frame is provided with an upper rolling mechanism, a lower rolling mechanism, a fixed liquid bulging hydraulic cylinder and a movable liquid bulging hydraulic cylinder. The upper rolling mechanism and the lower rolling mechanism are arranged oppositely, and the upper rolling mechanism and the lower rolling mechanism are used to roll surfaces of a to-be-machined tubular product. The fixed liquid bulging hydraulic cylinder and the movable liquid bulging hydraulic cylinder are arranged oppositely, and the fixed liquid bulging hydraulic cylinder and the movable liquid bulging hydraulic cylinder are used to perform hydraulic bulging on the to-be-machined tubular product.

Preferably, the frame includes a plurality of stand columns, an upper crossbeam, a lower crossbeam, a middle fixed beam and a hydraulic cylinder motion guide rail. The upper crossbeam is fixedly connected with the upper ends of the plurality of stand columns. The lower crossbeam is fixedly connected with the lower ends of the plurality of stand columns. The middle fixed beam is fixedly connected with the stand columns through double fastening nuts. The hydraulic cylinder motion guide rail is fixedly connected with the stand columns.

Preferably, the upper rolling mechanism is arranged on the upper crossbeam. The lower rolling mechanism is arranged on the lower crossbeam. The fixed liquid bulging hydraulic cylinder is fixedly arranged on the middle fixed beam. The movable liquid bulging hydraulic cylinder is slidably connected with the hydraulic cylinder motion guide rail.

Preferably, the upper crossbeam is fixedly connected with an upper movable crossbeam guide rail. The upper movable crossbeam guide rail is slidably connected with an upper movable crossbeam inner slide block. One side of the upper movable crossbeam inner slide block is fixedly connected with a plunger of an upper main motion cylinder. The upper rolling mechanism is fixed at the other side of the upper movable crossbeam inner slide block. The lower crossbeam includes a lower movable crossbeam guide rail and a lower movable crossbeam inner slide block which are slidably connected. One side of the lower movable crossbeam inner slide block is fixedly connected with a plunger of a lower main motion cylinder. The lower rolling mechanism is fixed at the other side of the lower movable crossbeam inner slide block.

Preferably, wedge blocks are arranged respectively between the upper rolling mechanism and the upper movable crossbeam inner slide block and between the lower rolling mechanism and the lower movable crossbeam inner slide block. The upper rolling mechanism is detachably connected with an upper rolling mold. The lower rolling mechanism is detachably connected with a lower rolling mold.

Preferably, the upper movable crossbeam guide rail and the lower movable crossbeam guide rail are arranged in parallel. The hydraulic cylinder motion guide rail and the upper movable crossbeam guide rail are arranged vertically.

Preferably, the fixed liquid bulging hydraulic cylinder and the movable liquid bulging hydraulic cylinder have the same structure. Each of the fixed liquid bulging hydraulic cylinder and the movable liquid bulging hydraulic cylinder includes a piston rod, a piston, a ball bearing, a bulging head, a cylinder barrel set, a gland, a cylinder cover, a guide sleeve and a flange. The guide sleeve is connected with the cylinder barrel set. A main body portion of the guide sleeve is arranged in the cylinder barrel set. The gland seals one end of the cylinder barrel set. The outer end of the gland is connected with the flange. The cylinder cover seals the other end of the cylinder barrel set. The ball bearing is embedded inside the cylinder cover. The bulging head is inserted into the ball bearing. The bulging head is fixed axially. The bulging head can rotate through the ball bearing. The piston is arranged in the cylinder barrel set and located between the guide sleeve and the gland. One end of the piston rod is inserted in the cylinder cover, and the other end of the piston rod passes through the guide sleeve, the piston, the gland and the flange in sequence to extend out of the cylinder barrel set. The side portion of the flange is provided with an oil inlet. An oil pool is arranged inside the flange. The piston rod is provided with an oil inlet. An oil passage communicated with the oil inlet is arranged axially in the piston rod. External hydraulic oil enters the oil pool through the oil inlet on the flange and then enters the oil passage of the piston rod through the oil inlet of the piston rod. The cylinder cover and the bulging head are internally and axially provided with an oil passage communicated each other. The oil passages in the cylinder cover and the bulging head are communicated with the oil passage in the piston rod. The hydraulic oil enters the oil passage of the piston rod so as to be charged into the to-be-machine tubular product through the oil passages on the cylinder cover and the bulging head. The side portion of the cylinder barrel set is provided with an oil inlet, thereby providing mechanical energy to the reciprocating rectilinear movement of the piston rod.

The bulging head at the front end of the fixed liquid bulging hydraulic cylinder stretches into one end of the to-be-machined tubular product. The bulging head at the front end of the movable liquid bulging hydraulic cylinder stretches into the other end of the to-be-machined tubular product. Sealing elements are arranged respectively between the to-be-machined tubular product and the bulging head at the front end of the fixed liquid bulging hydraulic cylinder and the bulging head at the front end of the movable liquid bulging hydraulic cylinder.

Preferably, the cylinder barrel set includes a cylinder barrel A and a cylinder barrel B. One end of a main body portion of the guide sleeve stretches into the cylinder barrel A and is fixedly connected with the cylinder barrel A. The cylinder barrel B is located between the other end of the guide sleeve and the gland. The guide sleeve and the gland are provided with connecting flanges. The connecting flanges on the guide sleeve and the gland are fixedly connected through an isometric double-end stud. The connecting flanges compress the cylinder barrel A and the cylinder barrel B.

Preferably, the cylinder cover and the cylinder barrel set are connected through a bolt.

The ball bearing and the bulging head are circumferentially fixed through a bolt.

Sealing rings are arranged respectively between the piston rod and the guide sleeve, the piston and the flange through which the piston rod penetrates.

Preferably, a cylinder body of the movable liquid bulging hydraulic cylinder is fixedly arranged at one side of a hydraulic cylinder slide block through a first connecting element. A plunger of an auxiliary motion cylinder of the movable liquid bulging hydraulic cylinder is fixedly arranged at the other side of the hydraulic cylinder slide block through a second connecting element. The hydraulic cylinder slide block is slidably connected with the hydraulic cylinder motion guide rail.

Compared with the prior art, the present invention has the following technical effects:

The present invention rolls the upper surface and lower surface of the to-be-machined tubular product respectively through the upper rolling mechanism and the lower rolling mechanism and performs hydraulic bulging on the interior of the to-be-machined tubular product through the fixed liquid bulging hydraulic cylinder and the movable liquid bulging hydraulic cylinder. The present invention combines the internal pressure hydraulic bulging and the external rolling forming to enable the diameter reduction and expansion of the to-be-machined tubular product to be carried out simultaneously and coordinated with each other, so that the shape forming can be realized, the wall thickness of the bulging area is not thinned excessively as far as possible, the uniformity of wall thickness and performance of formed products is enhanced, the quality of the tubular product can be greatly improved, and the production efficiency is increased.

BRIEF DESCRIPTION OF THE DRAWINGS

To more clearly describe the technical solutions in the embodiments of the present invention or in prior art, the drawings required to be used in the embodiments will be simply presented below. Apparently, the drawings in the following description are merely some embodiments of the present invention, and for those skilled in the art, other drawings can also be obtained according to these drawings without contributing creative labor.

DESCRIPTION OF NUMERALS IN THE DRAWINGS

Figure 1:
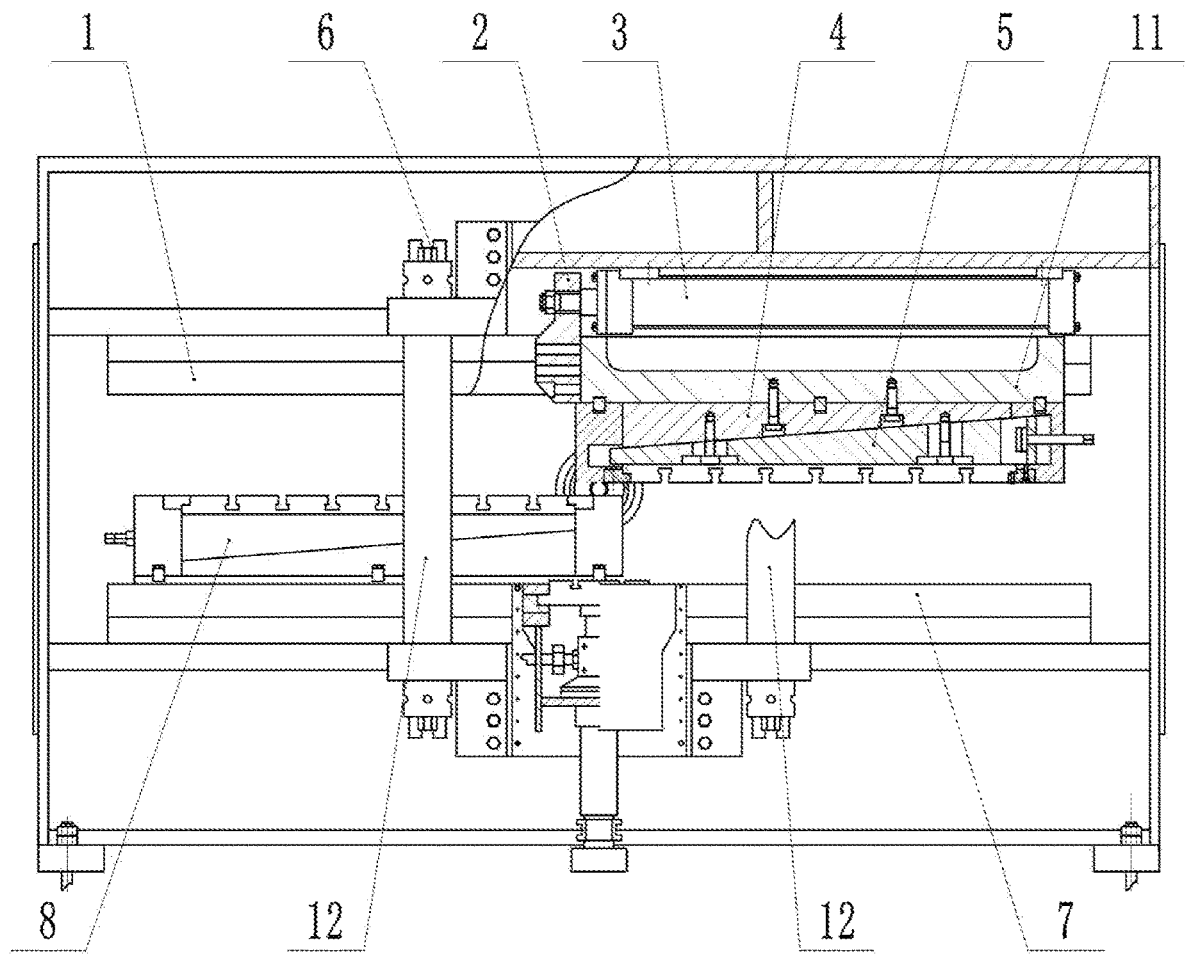
FIG. 1 is a front view of a rolling-bulging forming hydraulic machine for tubular products of the present invention.
Figure 2:
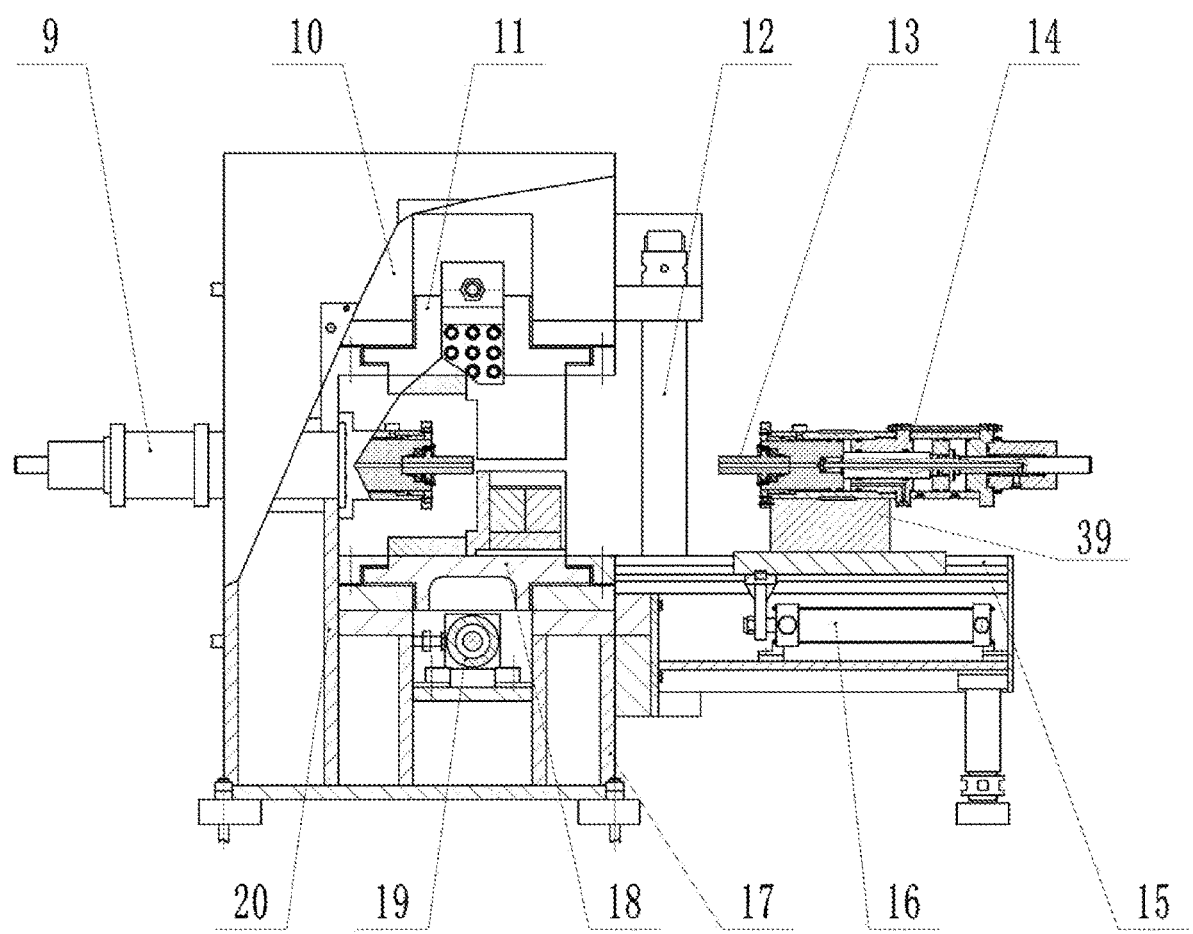
FIG. 2 is a left view of the rolling-bulging forming hydraulic machine for tubular products of the present invention.
Figure 3:
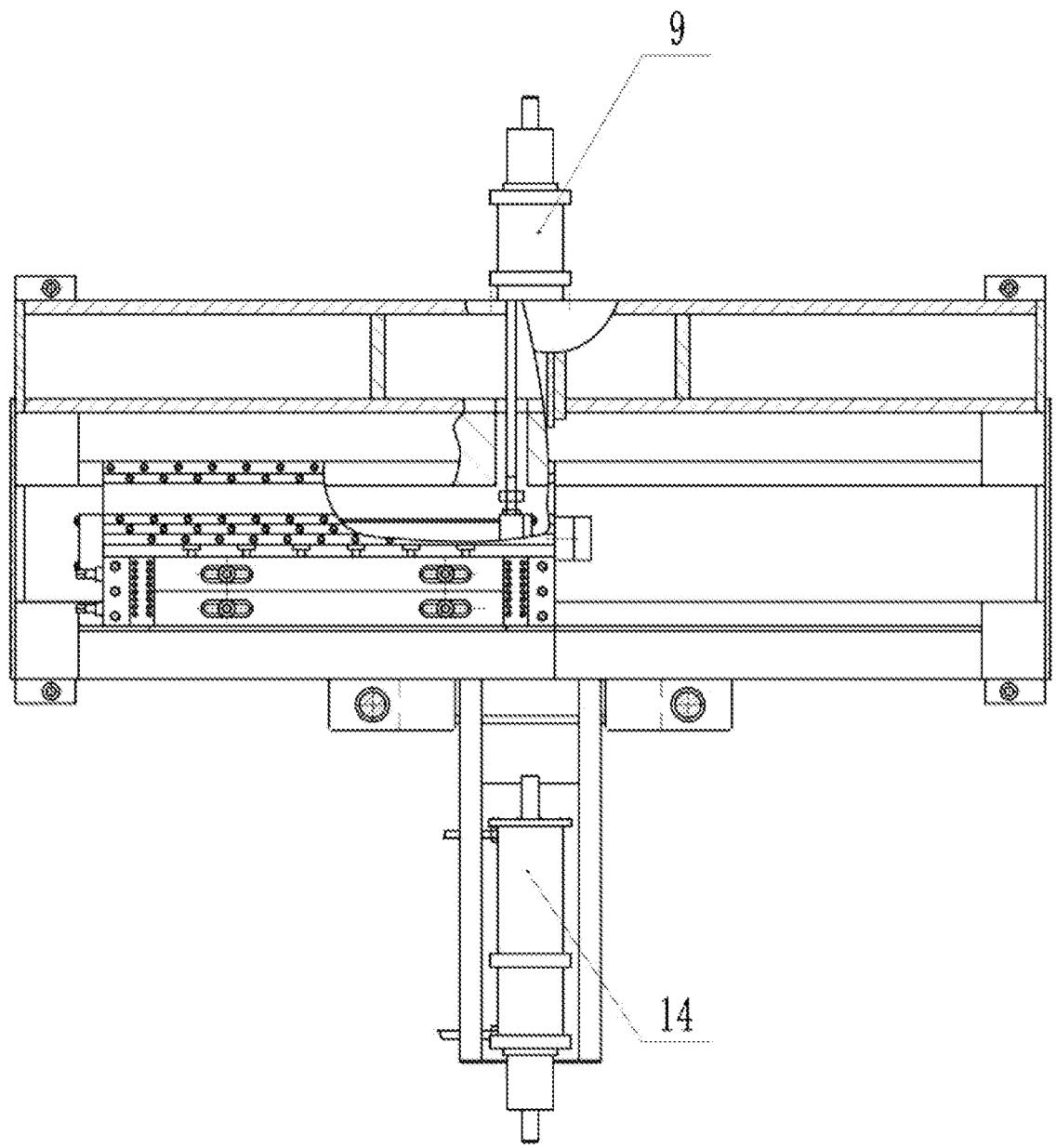
FIG. 3 is a top view of the rolling-bulging forming hydraulic machine for tubular products of the present invention.
Figure 4:
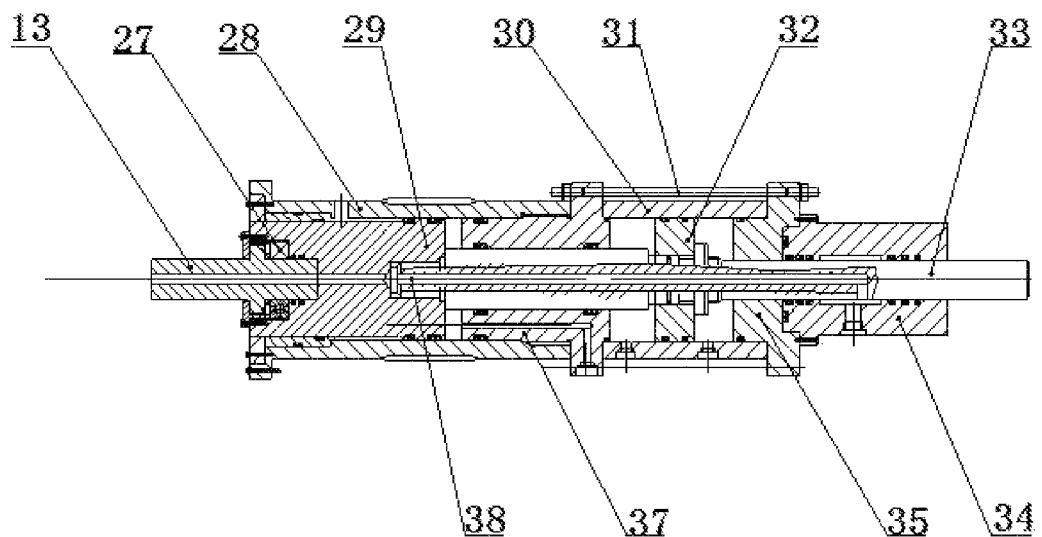
FIG. 4 is an internal structural schematic diagram of a fixed liquid bulging hydraulic cylinder and a movable liquid bulging hydraulic cylinder in the present invention.
Figure 5:
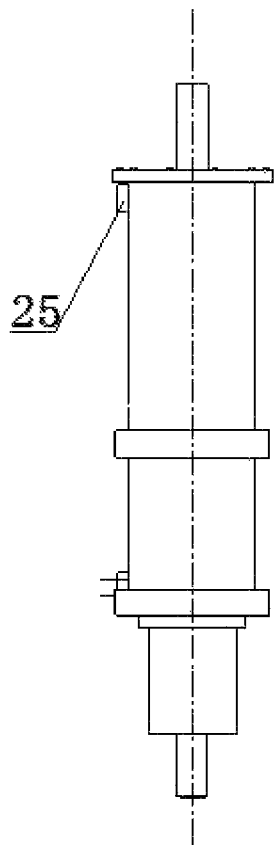
FIG. 5 is an external structural schematic diagram of the fixed liquid bulging hydraulic cylinder and the movable liquid bulging hydraulic cylinder in the present invention.

In the drawings: 1—upper movable crossbeam guide rail; 2—cantilever beam; 3—upper main motion cylinder; 4—wedge block; 5—upper rolling mechanism; 6—locking nuts; 7—lower movable crossbeam guide rail; 8—lower rolling mechanism; 9—fixed liquid bulging hydraulic cylinder; 10—upper crossbeam; 11—upper movable crossbeam inner slide block; 12—stand column; 13—bulging head; 14—movable liquid bulging hydraulic cylinder; 15—hydraulic cylinder motion guide rail; 16—auxiliary motion cylinder of the movable liquid bulging hydraulic cylinder; 17—lower crossbeam; 18—lower movable crossbeam inner slide block; 19—lower main motion cylinder; 20—middle fixed beam; 21—to-be-machined tubular product; 22—upper rolling mold; 23—lower rolling mold; 24—sealing element; 25—oil inlet valve; 26—hydraulic bulging pipe joint; 27—ball bearing; 28—first cylinder barrel; 29—cylinder cover; 30—second cylinder barrel; 31—isometric double-end stud; 32—piston; 33—piston rod; 34—flange; 35—gland; 36—O-shaped rubber sealing ring; 37—guide sleeve; 38—oil passage; and 39—hydraulic cylinder slide block.

DETAILED DESCRIPTION OF THE PRESENT INVENTION

The technical solutions in the embodiments of the present invention will be clearly and fully described below in combination with the drawings in the embodiments of the present invention. Obviously, provided below are merely some embodiments of the disclosure, which are not intended to limit the disclosure. Based on the embodiments in the present invention, all other embodiments obtained by those ordinary skilled in the art without contributing creative labor will belong to the protection scope of the present invention.

A purpose of the present invention is to provide a rolling-bulging forming hydraulic machine, which forms a to-be-machined tubular product under the simultaneous action of internal pressure hydraulic bulging and external roller forming. The diameter reduction and expansion of the to-be-machined tubular product are carried out simultaneously and coordinated with each other, so that the shape forming can be realized, the wall thickness of the bulging area is not thinned excessively as far as possible, and the uniformity of wall thickness and performance of formed products is enhanced.

To make the above purposes, features and advantages of the present invention more apparent and understandable, the present invention is further described in detail below in combination with the accompanying drawings and specific embodiments.

As shown in FIG. 1 to FIG. 5, the present invention provides a rolling-bulging forming hydraulic machine for tubular products, which includes a frame. The frame is provided with an upper rolling mechanism 5, a lower rolling mechanism 8, a fixed liquid bulging hydraulic cylinder 9 and a movable liquid bulging hydraulic cylinder 14. The upper rolling mechanism 5 and the lower rolling mechanism 8 are arranged oppositely, and the upper rolling mechanism 5 and the lower rolling mechanism 8 are used to roll surfaces of a to-be-machined tubular product 21. The fixed liquid bulging hydraulic cylinder 9 and the movable liquid bulging hydraulic cylinder 14 are arranged oppositely, and the fixed liquid bulging hydraulic cylinder 9 and the movable liquid bulging hydraulic cylinder 14 are used to perform hydraulic bulging on the to-be-machined tubular product 21.

The present embodiment rolls the upper surface and lower surface of the to-be-machined tubular product 21 respectively through the upper rolling mechanism 5 and the lower rolling mechanism 8 and performs hydraulic bulging on the interior of the to-be-machined tubular product 21 through the fixed liquid bulging hydraulic cylinder 9 and the movable liquid bulging hydraulic cylinder 14. The present embodiment combines the internal pressure hydraulic bulging and the external rolling forming to enable the diameter reduction and expansion of the to-be-machined tubular product 21 to be carried out simultaneously and coordinated with each other, so that the shape forming can be realized, the wall thickness of the bulging area is not thinned excessively as far as possible, the uniformity of wall thickness and performance of formed products is enhanced, the quality of the tubular product can be greatly improved, and the production efficiency is increased.

Specifically, the frame of the present embodiment includes a plurality of stand columns 12, an upper crossbeam 10, a lower crossbeam 17, a middle fixed beam 20 and a hydraulic cylinder motion guide rail 15. The number of the stand columns 12 in the present embodiment is four. The upper crossbeam 10 is fixedly connected with the upper ends of the four stand columns 12. The lower crossbeam 17 is fixedly connected with the lower ends of the four stand columns 12. The upper crossbeam 10 and the lower crossbeam 17 are parallel to each other and are arranged oppositely in the vertical direction. The middle fixed beam 20 is fixedly connected with two stand columns 12 at one side of the middle fixed beam 20 through two locking nuts 6. The hydraulic cylinder motion guide rail 15 is fixedly connected with the two stand columns 12 at the other side of the middle fixed beam 20. The upper rolling mechanism 5 is arranged on the upper crossbeam 10. The lower rolling mechanism 8 is arranged on the lower crossbeam 17. The fixed liquid bulging hydraulic cylinder 9 is fixedly arranged on the middle fixed beam 20. The movable liquid bulging hydraulic cylinder 14 is slidably connected with the hydraulic cylinder motion guide rail 15.

Specifically, in the present embodiment, the upper crossbeam 10 is fixedly connected with an upper movable crossbeam guide rail 1. The upper movable crossbeam guide rail 1 is slidably connected with an upper movable crossbeam inner slide block 11. One side of the upper movable crossbeam inner slide block 11 is fixedly connected with a plunger of an upper main motion cylinder 3 through a cantilever beam 2. The upper main motion cylinder 3 is fixed on the upper crossbeam 10. The upper rolling mechanism 5 is fixed at the other side of the upper movable crossbeam inner slide block 11. The plunger of the upper main motion cylinder 3 drives the upper movable crossbeam inner slide block 11 to slide along the upper movable crossbeam guide rail 1 and further drives the upper rolling mechanism 5 on the upper movable crossbeam inner slide block 11 to move along the axial direction of the to-be-machined tubular product 21 so as to roll the upper surface of the to-be-machined tubular product 21. The lower crossbeam 17 includes a lower movable crossbeam guide rail 7 and a lower movable crossbeam inner slide block 18 which are slidably connected. One side of the lower movable crossbeam inner slide block 18 is fixedly connected with a plunger of a lower main motion cylinder 19 through a cantilever beam 2. The lower rolling mechanism 8 is fixed at the other side of the lower movable crossbeam inner slide block 18. The plunger of the lower main motion cylinder 19 drives the lower movable crossbeam inner slide block 18 to slide along the lower movable crossbeam guide rail 7 and further drives the lower rolling mechanism 8 on the lower movable crossbeam inner slide block 18 to move along the axial direction of the to-be-machined tubular product 21 so as to roll the lower surface of the to-be-machined tubular product 21.

In the present embodiment, the upper movable crossbeam guide rail 1 and the lower movable crossbeam guide rail 7 are arranged in parallel. The hydraulic cylinder motion guide rail 15 and the upper movable crossbeam guide rail 1 are arranged vertically.

In the present embodiment, wedge blocks 4 are arranged respectively between the upper rolling mechanism 5 and the upper movable crossbeam inner slide block 11 and between the lower rolling mechanism 8 and the lower movable crossbeam inner slide block 18. The upper rolling mechanism 5 is detachably connected with an upper rolling mold 22. The lower rolling mechanism 8 is detachably connected with a lower rolling mold 23.

In the present embodiment, a cylinder body of the movable liquid bulging hydraulic cylinder 14 is fixedly arranged at one side of a hydraulic cylinder slide block 39 through a first connecting element. A plunger of an auxiliary motion cylinder 16 of the movable liquid bulging hydraulic cylinder is fixedly arranged at the other side of the hydraulic cylinder slide block 39 through a second connecting element. The hydraulic cylinder slide block 39 is slidably connected with the hydraulic cylinder motion guide rail 15. A bulging head 13 at the front end of the plunger of the fixed liquid bulging hydraulic cylinder 9 can directly stretch into one end of the to-be-machined tubular product 21. The bulging head 13 at the front end of the plunger of the movable liquid bulging hydraulic cylinder 14 can directly stretch into the other end of the to-be-machined tubular product 21. Sealing elements 24 are arranged respectively between the to-be-machined tubular product 21 and the bulging head 13 at the front end of the plunger of the fixed liquid bulging hydraulic cylinder 9 and the bulging head 13 at the front end of the plunger of the movable liquid bulging hydraulic cylinder 14.

Specifically, in the present embodiment, the fixed liquid bulging hydraulic cylinder 9 and the movable liquid bulging hydraulic cylinder 14 have the same structure and each includes a piston rod 33, a piston 32, a ball bearing 27, a bulging head 13, a cylinder barrel set, a gland 35, a cylinder cover 29, a guide sleeve 37 and a flange 34. The guide sleeve 37 is connected with the cylinder barrel set, a main body portion is arranged in the cylinder barrel set, and the guide sleeve 37 is used to guide the piston rod 33. The gland 35 seals one end of the cylinder barrel set, and the outer end of the gland 35 is connected with the flange 34 through a bolt. The cylinder cover 29 seals the other end of the cylinder barrel set and is connected with the cylinder barrel set through a bolt. The ball bearing 27 is embedded in the cylinder cover 29. The bulging head 13 is inserted into the ball bearing 27, the bulging head 13 is axially fixed to the ball bearing 27 through the bolt and can rotate through the ball bearing 27, and when the to-be-machined tubular product 21 rotates, the bulging head 13 can rotate together. The piston 32 is arranged in the cylinder barrel set and located between the guide sleeve 37 and the gland 35. One end of the piston rod 33 is inserted into the cylinder cover 29, and the other end of the piston rod 33 penetrates through the guide sleeve 37, the piston 32, the gland 35 and the flange 34 in sequence to extend out of the cylinder barrel set. The side portion of the flange 34 is provided with an oil inlet, and an oil pool is arranged inside the flange. The piston rod 33 is provided with an oil inlet. An oil passage 38 communicated with the oil inlet is arranged axially in the piston rod 33. Outer hydraulic oil enters the oil pool through the oil inlet on the flange 34 and then enters the oil passage 38 of the piston rod 33 through the oil inlet of the piston rod 33. Oil passages that are communicated with each other are arranged axially in the cylinder cover 29 and the bulging head 13, and the oil passages are communicated with the oil passage 38 in the piston rod 33. The hydraulic oil enters the oil passage of the piston rod 33 so as to be charged into the to-be-machined tubular product 21 through the oil passages on the cylinder cover 29 and the bulging head 13.

In the present embodiment, the cylinder barrel set includes a first cylinder barrel 28 and a second cylinder barrel 30. One end of a main body portion of the guide sleeve 37 stretches into the first cylinder barrel 28 and is fixedly connected with the first cylinder barrel 28. The second cylinder barrel 30 is located between the other end of the guide sleeve 37 and the gland 35. The guide sleeve 37 and the gland 35 are provided with connecting flanges 34, and the connecting flanges 34 of the two are fixedly connected through an isometric double-end stud 31 and compress the first cylinder barrel 28 and the second cylinder barrel 30 between the two.

The side portions of the first cylinder barrel 28 and the second cylinder barrel 30 are provided with an oil inlet. The hydraulic oil enters the first cylinder barrel 28 and the second cylinder barrel 30 through an oil pipe, thereby providing mechanical energy to the reciprocating rectilinear movement of the piston rod 33.

In the present embodiment, sealing rings are arranged respectively between the piston rod 33 and the guide sleeve 37, the piston 32 and the flange 34 through which the piston rod penetrates. A sealing ring is also arranged between the guide sleeve 37 and the inner wall of the first cylinder barrel 28. The sealing rings for sealing in other positions are not repeated in the present embodiment.

In the present embodiment, the piston 32 is arranged freely in an inner cavity of the cylinder barrel set and can make reciprocating movement along the axial direction under the action of internal energy. The piston rod 33 penetrates through the cylinder barrel set and is driven by the piston 32 to make reciprocating rectilinear movement in a stepped shaft manner, thereby implementing the overall mechanical movement of the hydraulic cylinder. The hydraulic oil is charged into the cylinder barrel set and the oil passage in the piston rod 33 through an oil inlet valve 25 to provide internal energy for the mechanical movement of the hydraulic cylinder. At the same time, the hydraulic oil can be charged into the to-be-machined tubular product 21 through the oil passage in the bulging head 13 to provide hydraulic bulging pressure for a bulging step. The ball bearing 27 is installed at the head end of the cylinder cover 29, the bulging head 13 is inserted into the bearing, and the rotation of the to-be-machined tubular product 21 can drive the bulging head 13 to rotate.

Figure 6:
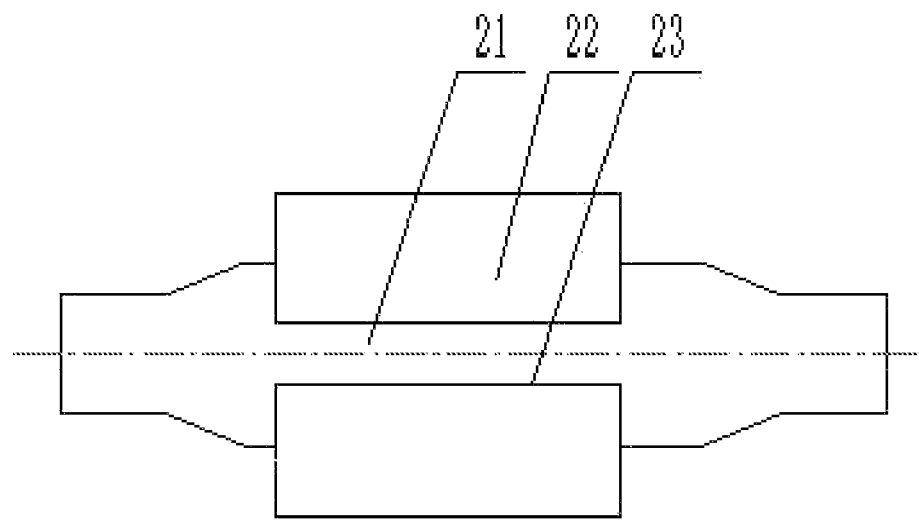
FIG. 6 is a schematic diagram of external rolling by using the rolling-bulging forming hydraulic machine for the tubular products of the present invention.
Figure 7:
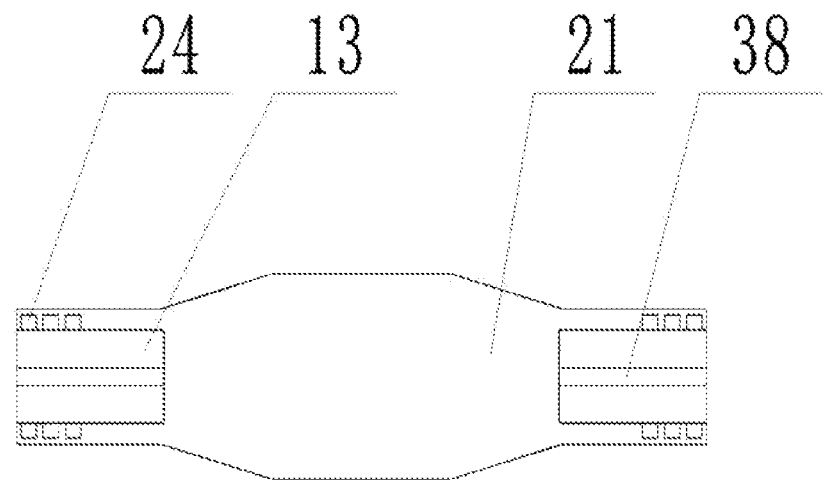
FIG. 7 is a schematic diagram of internal bulging by using the rolling-bulging forming hydraulic machine for the tubular products of the present invention.

As shown in FIG. 6 and FIG. 7, a stepped to-be-machined tubular product 21 with a middle diameter $d_0$ of 102 mm and two-end diameter $d_1$ of 67 mm is machined. The to-be-machined tubular product 21 is placed on the lower rolling mold 23; one end is inserted into the bulging head 13 at the front end of the plunger of the fixed liquid bulging hydraulic cylinder 9, and then the movable liquid bulging hydraulic cylinder 14 is moved to make the bulging head 13 at the front end of the plunger of the movable liquid bulging hydraulic cylinder 14 enter the other end of the to-be-machined tubular product 21; the upper rolling mold 22 and the lower rolling mold 23 are well adjusted in positions; the upper movable crossbeam inner slide block 11 is pushed by the upper main motion cylinder 3 to reciprocate along the upper movable crossbeam guide rail 1, thereby driving the upper rolling mechanism 5 to make horizontal reciprocating movement along the upper movable crossbeam guide rail 1 so as to make the to-be-machined tubular product 21 have plastic deformation under the contact friction and pressure with the to-be-machined tubular product 21, thereby realizing the rolling process of the to-be-machined tubular product 21; and meanwhile, the lower rolling mechanism 8 makes the same movement to complete the up-down simultaneous rolling forming of the to-be-machined tubular product 21. Thus, during the rolling forming of the tubular product and the external compression, each oil inlet is connected to an oil pump through the oil pipe, and the oil pump is started to charge hydraulic oil into the cylinder barrel set, the inner cavity of the cylinder barrel set and the oil passage in the piston rod 33 to keep the hydraulic pressure in a given range. The specific value is determined according to a metal type of the to-be-machined part. The oil pressure in the cavity of the cylinder barrel set converts the internal energy into the mechanical energy to push the piston 32 to drive the piston rod 33 to make reciprocating rectilinear movement; and the hydraulic oil in the piston rod 33 enters the bulging head 13 through the internal oil passage and is further charged into the to-be-machined tubular product 21 to provide internal pressure. At the same time, the internal energy can also be converted into the mechanical energy for the bulging head 13 to rotate so as to drive the to-be-machined tubular product 21 to complete a rotation procedure. Through the internal high pressure and the rotation around the central axis, the internal hydraulic bulging process is completed by combining other external acting forces, so that the to-be-machined tubular product 21 attains the final plastic deformation, thereby obtaining a finished tubular product. By repeating the entire working process, the mass production of the novel tubular products can be realized.

Figure 8:
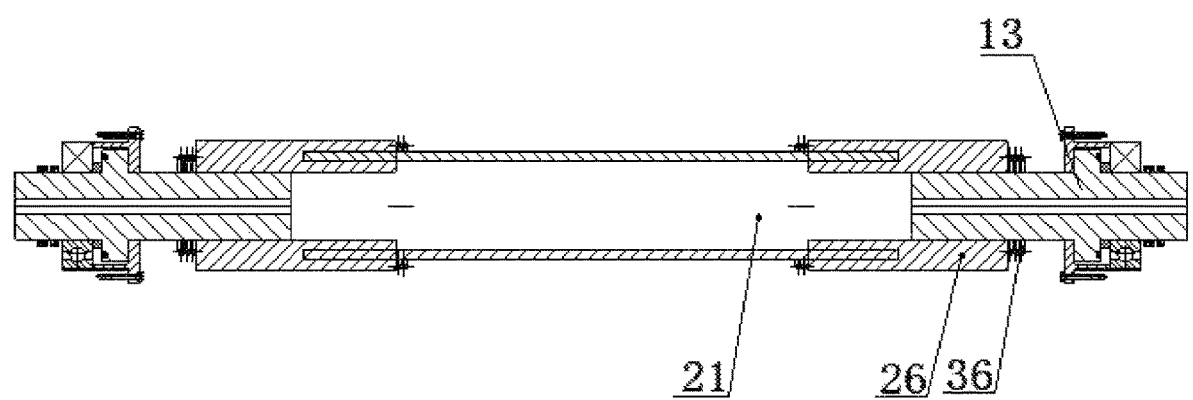
FIG. 8 is a schematic diagram of connection of the fixed liquid bulging hydraulic cylinder and the movable liquid bulging hydraulic cylinder with the to-be-machined tubular product in the present invention.

As shown in FIG. 8, during the internal hydraulic bulging, the bulging head 13 may also be inserted into the hydraulic bulging pipe joint 26; the other end of the hydraulic bulging pipe joint 26 is provided with a slot; the to-be-machined tubular product 21 is inserted into the slot, and each interface is sealed by an O-shaped rubber sealing ring 36, thereby guaranteeing the hydraulic bulging pressure in the tubular product.

The principle and embodiments of the present invention are described herein with specific examples. The above embodiments are explained only to help the understanding of the method and core concept of the present invention. Meanwhile, for those ordinary skilled in the art, according to the concept of the present invention, the specific embodiments and application scopes may be changed. In conclusion, the content of the description shall not be construed as limiting the present invention.

What is claimed is:

1. A rolling-bulging forming hydraulic machine for tubular products, comprising a frame, wherein the frame is provided with an upper rolling block, a lower rolling block, a fixed liquid bulging hydraulic cylinder and a movable liquid bulging hydraulic cylinder; the upper rolling block and the lower rolling block are arranged oppositely; the upper rolling block is configured to roll an upper surface of a to-be-machined tubular product; the lower rolling block is configured to roll a lower surface of the to-be-machined tubular product; the fixed liquid bulging hydraulic cylinder and the movable liquid bulging hydraulic cylinder are arranged oppositely, and the fixed liquid bulging hydraulic cylinder and the movable liquid bulging hydraulic cylinder are configured to charge hydraulic oil into the to-be-machined tubular product to perform hydraulic bulging on the to-be-machined tubular product;

the frame comprises a plurality of stand columns, an upper crossbeam, a lower crossbeam, a middle fixed beam and a hydraulic cylinder motion guide rail; the upper crossbeam is fixedly connected with the upper ends of the plurality of stand columns; the lower crossbeam is fixedly connected with the lower ends of the plurality of stand columns; the middle fixed beam is fixedly connected with the stand columns through two locking nuts; and the hydraulic cylinder motion guide rail is fixedly connected with the stand columns;

the upper rolling block is arranged on the upper crossbeam; the lower rolling block is arranged on the lower crossbeam; the fixed liquid bulging hydraulic cylinder is fixedly arranged on the middle fixed beam; and the movable liquid bulging hydraulic cylinder is slidably connected with the hydraulic cylinder motion guide rail;

the upper crossbeam is fixedly connected with an upper movable crossbeam guide rail; the upper movable crossbeam guide rail is slidably connected with an upper movable crossbeam inner slide block; a first side of the upper movable crossbeam inner slide block is fixedly connected with a plunger of an upper main motion cylinder; the upper rolling block is fixed at a second side of the upper movable crossbeam inner slide block; the lower crossbeam comprises a lower movable crossbeam guide rail and a lower movable crossbeam inner slide block; the lower movable crossbeam guide rail and the lower movable crossbeam inner slide block are slidably connected; a first side of the lower movable crossbeam inner slide block is fixedly connected with a plunger of a lower main motion cylinder; and the lower rolling block is fixed at a second side of the lower movable crossbeam inner slide block;

the plunger of the upper main motion cylinder is configured to drive the upper movable crossbeam inner slide block to slide along the upper movable crossbeam guide rail to drive the upper rolling block to move along an axial direction of the to-be-machined tubular product, so as to roll the upper surface of the to-be-machined tubular product;

the plunger of the lower main motion cylinder is configured to drive the lower movable crossbeam inner slide block to slide along the lower movable crossbeam guide rail to drive the lower rolling block to move along the axial direction of the to-be-machined tubular product, so as to roll the lower surface of the to-be-machined tubular product;

wherein the fixed liquid bulging hydraulic cylinder and the movable liquid bulging hydraulic cylinder have the same structure; each of the fixed liquid bulging hydraulic cylinder and the movable liquid bulging hydraulic cylinder comprises a piston rod, a piston, a ball bearing, a bulging head, a cylinder barrel set, a gland, a cylinder cover, a guide sleeve and a flange; the guide sleeve is connected with the cylinder barrel set; a main body portion of the guide sleeve is arranged in the cylinder barrel set; the gland seals a first end of the cylinder barrel set; the outer end of the gland is connected with the flange; the cylinder cover seals a second end of the cylinder barrel set; the ball bearing is embedded inside the cylinder cover; the bulging head is inserted into the ball bearing; the bulging head is fixed axially with respect to the ball bearing; the bulging head rotates on a common axis with the ball bearing; the piston is arranged in the cylinder barrel set and located between the guide sleeve and the gland; a first end of the piston rod is inserted in the cylinder cover, and a second end of the piston rod passes through the guide sleeve, the piston, the gland and the flange in sequence to extend out of the cylinder barrel set; the side portion of the flange is provided with a first oil inlet; an oil pool is arranged inside the flange; the piston rod is provided with a second oil inlet; a first oil passage is arranged axially in the piston rod; the first oil passage communicates with the second oil inlet; the hydraulic oil enters the oil pool through the first oil inlet and then enters the first oil passage through the second oil inlet; the cylinder cover is internally and axially provided with a second oil passage, and the bulging head is internally and axially provided with a third oil passage; the second oil passage communicates with the third oil passage; the second oil passage and the third passage communicate with the first oil passage; the hydraulic oil enters the first oil passage so as to be charged into the to-be-machined tubular product through the second oil passage and the third oil passage to provide internal pressure to perform internal hydraulic bulging; and the side portion of the cylinder barrel set is provided with a third oil inlet, thereby providing mechanical energy to a reciprocating rectilinear movement of the piston rod; and the bulging head at a front end of the fixed liquid bulging hydraulic cylinder stretches into a first end of the to-be-machined tubular product; the bulging head at a front end of the movable liquid bulging hydraulic cylinder stretches into a second end of the to-be-machined tubular product; and sealing elements are arranged respectively between the to-be-machined tubular product and the bulging head at the front end of the fixed liquid bulging hydraulic cylinder and the bulging head at the front end of the movable liquid bulging hydraulic cylinder.

2. The rolling-bulging forming hydraulic machine for tubular products according to claim 1, wherein wedge blocks are arranged respectively between the upper rolling block and the upper movable crossbeam inner slide block and between the lower rolling block and the lower movable crossbeam inner slide block.

3. The rolling-bulging forming hydraulic machine for tubular products according to claim 1, wherein the upper movable crossbeam guide rail and the lower movable crossbeam guide rail are arranged in parallel; and the hydraulic cylinder motion guide rail is perpendicular to the upper movable crossbeam guide rail.

4. The rolling-bulging forming hydraulic machine for tubular products according to claim 1, wherein the cylinder barrel set comprises a cylinder barrel A and a cylinder barrel B; a first end of a main body portion of the guide sleeve stretches into the cylinder barrel A and is fixedly connected with the cylinder barrel A; the cylinder barrel B is located between a second end of the guide sleeve and the gland; the guide sleeve and the gland are provided with connecting flanges; the connecting flanges on the guide sleeve and the gland are fixedly connected through an isometric double-end stud; and the connecting flanges compress the cylinder barrel A and the cylinder barrel B.

5. The rolling-bulging forming hydraulic machine for tubular products according to claim 1, wherein the cylinder cover and the cylinder barrel set are boltedly connected;
the ball bearing and the bulging head are circumferentially boltedly fixed;
sealing rings are arranged respectively between the piston rod and the guide sleeve, the piston and the flange through which the piston rod penetrates.

6. The rolling-bulging forming hydraulic machine for tubular products according to claim 1, wherein a cylinder body of the movable liquid bulging hydraulic cylinder is fixedly arranged at a first side of a hydraulic cylinder slide block through a first connecting element; a plunger of an auxiliary motion cylinder of the movable liquid bulging hydraulic cylinder is fixedly arranged at a second side of the hydraulic cylinder slide block through a second connecting element; and the hydraulic cylinder slide block is slidably connected with the hydraulic cylinder motion guide rail.

* * * * *